United States Patent Office 3,360,355
Patented Dec. 26, 1967

3,360,355
METHOD OF SUPPLYING SULFUR AND NITROGEN TO SOIL
Franz A. Horsley, Danville, and Floyd H. Leavitt, Modesto, Calif., assignors to Shell Oil Company, New York, N.Y., a corporation of Delaware
No Drawing. Filed Apr. 20, 1964, Ser. No. 361,240
7 Claims. (Cl. 71—61)

This application is a continuation-in-part of our co-pending application Ser. No. 135,797, filed Sept. 5, 1961, now abandoned.

This invention relates to the fertilizing of soil, and is particularly concerned with the dissemination of fixed nitrogen and sulfur in soil.

Orthodox agricultural practice requires replacement of elements in soil that are removed by plants growing therein, which elements are not readily replaced, or can be replaced only to a limited extent, by the soil. Two such elements are nitrogen and (in an increasing number of soils) sulfur. (Sulfur also is used to control the pH of alkaline soils.) It is common practice to replace nitrogen by introduction of anhydrous ammonia directly into the soil. For many years, sulfur has been introduced into soil by spreading a sulfur-containing solid chemical (gypsum (calcium sulfate), powdered sulfur or flowers or sulfur) on top of the soil, then mixing it with the soil. This procedure has not proven entirely satisfactory, since introduction of the chemical into the zone in which the roots are growing, often several inches below the surface of the soil, requires that the chemical be disseminated in the entire soil zone down to that depth. This often requires excessive chemical and thus is wasteful. Because they can be applied precisely where needed, liquid formulations now are preferred in many cases; hence in comparatively recent practice, sulfur is introduced into soil in liquid form: by applying aqueous solutions (which may be in part suspensions) of calcium, or other metal, polysulfides, or ammonium polysulfide—this latter material also providing nitrogen. (It is of course, desirable to incorporate a nitrogen source and a sulfur source together, since this will reduce the number of applications—providing, of course, that the amount of each can be adjusted to meet the requirements of each particular case, and the two are compatible.) The polysulfides all have drawbacks: they all have very poor odor—this is particularly true of ammonium polysulfide. In the case of the metal polysulfides, if one attempts to mix ammonia therewith to provide a multi-element material, solid material precipitates, causing plugging of equipment used to apply the mixture. Further, the sulfur in polysulfides is very readily available, the sulfide readily converting in the soil to sulfate (the form in which plants assimilate sulfur), so that these materials are short-lived sources of sulfur, and this may not be desirable.

To provide a less readily available source of sulfur—one having a longer life—it has been proposed to apply suspensions of finely divided sulfur in dilute aqueous ammonia. Such has the drawback that the suspension must be prepared just before it is used—it cannot be stored for any substantial length of time because of the tendency of the sulfur to settle out, causing handling difficulties.

There is, accordingly, a need for a stable, readily handled and applied liquid fertilizer composition containing both fixed nitrogen and sulfur, in which the ratio of nitrogen to sulfur can be varied within wide limits to provide the balance of nitrogen and sulfur needed for the particular plant to be grown in the soil to be fertilized. This latter factor is important, if sufficient of each of the two elements is to be supplied without excess—waste—of either, for the requirements of various plant species differ widely. Thus, for example, vegetables such as cabbage and turnips take up about 2.5 to 4 or 5 pounds of nitrogen per pound of sulfur taken up, while corn on the other hand, takes up about 16–20 pounds of nitrogen per pound of sulfur taken up, with other commercial crops, such as cotton, wheat, alfalfa, clovers, grasses and onions, requiring nitrogen-to-sulfur ratios in between these limits.

It now has been found that anhydrous solutions of elemental sulfur in liquid ammonia admirably satisify all of the requirements set out above, and appear to have few, if any, drawbacks. Such solutions are readily handled and applied, using readily fabricated equipment, and give no difficulties with equipment plugging when for example operating in the equipment of, and according to the technique of copending application Ser. No. 206,417; they provide a wide range of nitrogen-to-sulfur ratios, do not have the objectionable sulfide odor, and provide a relatively long-lived source of sulfate—rate and duration comparable to those of flowers of sulfur.

These solutions are very simply prepared by mixing the sulfur with the ammonia. The sulfur may be solid, or it may be liquid. When solid, preferably it is very finely divided—as in flowers of sulfur. For reasons that will be apparent hereinafter, it is preferred to employ liquid—i.e., melted—sulfur. The following examples illustrate the preparation of typical solutions of sulfur in anhydrous liquid ammonia.

Example I

A cylinder of 50 pounds capacity was charged with 5 pounds of sulfur and then loaded with 25 pounds of anhydrous ammonia. Temperature was maintained at 60–70° F. for 14 days during part of which time the cylinder was revolved in a horizontal position. At the end of this period a sample of the liquid contents was taken in a Dewar flask immediately upon opening the cylinder. The liquid was homogeneous and contained no solids in suspension. When the cylinder had been emptied it was cut in half and examined. All sulfur had been dissolved.

Example II

Flowers of sulfur were added to each of three pressure cylinders of 150 pounds capacity. 60 pounds of anhydrous ammonia was then added. The shut-off valves were closed and the cylinders suspended and turned end-over-end for 2 hours and then allowed to stand for 2 days. 40 pounds of anhydrous ammonia was then added. Complete solution of the sulfur was obtained and indicated by the free fall of a piece of metal placed inside each cylinder as an indicator.

The following data were noted:

| Cylinder | 1 | 2 | 3 |
|---|---|---|---|
| Ratio N/S, by weight | 5:1 | 4:1 | 4.5:1 |
| Pounds $NH_3$ | 100 | 100 | 100 |
| Pounds S | 16.45 | 20.56 | 18.28 |
| N, percent by weight added | 70.63 | 68.22 | 69.53 |
| S, percent by weight added | 14.13 | 17.05 | 15.45 |
| $NH_3$, percent by weight added | 85.87 | 82.95 | 84.55 |
| Gauge Pressure (pounds per square inch) | 80 | 78 | 81 |
| Temp., ° F | 41 | 41 | 41 |

Example III

Two pressure skid tanks of 1000 pounds capacity were used as preparation vessels. The desired amount of sulfur was put in each tank and anhydrous ammonia then added. The contents of the tanks were mixed by placing the tanks on a fork lift truck and tilting the angle of the forks in a rhythmic manner is as to cause the contents to slosh back and forth. After very little mixing, spot samples of liquid from the tanks were reddish black in color indicating solution of the sulfur was taking place. The contents were mixed several times for extended periods. The solution was then transferred to the shipping tanks, samples were withdrawn through a coil immersed in a bath of Dry Ice ($CO_2$) and acetone so that the sample could be sub-cooled and more accurate sulfur analyses obtained:

These were as follows:

| Tank | 1 | 2 | 3 | 4 |
| --- | --- | --- | --- | --- |
| Final percent S calculated | 17.6 | 17.3 | 16.5 | 17.3 |
| Actual | 17.1 | 17.3 | 16.1 | 17.5 |
| N/S weight ratio | 4.0 | 3.9 | 4.3 | 3.9 |

*Example IV*

Tank car lots of anhydrous solutions of sulfur in ammonia are prepared as follows:

Anhydrous liquid ammonia, containing about 20 parts per million of water, and at 43° F., is pumped at the rate of about 150 gallons per minute into a 15,000 gallon tank equipped with internal stirring equipment, until 51,300 pounds of ammonia have been charged. Simultaneously, sulfur, maintained in the molten state by use of 50 pounds per square inch steam, and containing essentially no water, is pumped into the tank at the rate of about 1.5 gallons per minute, until 5,700 pounds of sulfur have been charged, the sulfur being continuously mixed with the ammonia during the addition of the two materials, and for approximately one hour thereafter. Then the resulting solution is pumped into a dry tank car.

To maintain ammonia liquid, it is necessary either to (a) maintain the temperature thereof below the liquefaction temperature (−28° F.) at atmospheric pressure, or (b) maintain a pressure above the liquefaction pressure at the ambient temperature—for example, the liquefaction pressure at 104° F. is 225.5 p.s.i.a. It has not been found practical to maintain the low temperature—the sulfur does not dissolve as readily as desired at such temperatures and operation with refrigeration is not practical on the farm application level. Consequently, it is preferably to maintain the ammonia as a liquid by means of suitable pressure.

Such solutions are applied to the soil by introducing the liquid solution directly into the soil. In typical application, the solution, maintained under the necessary pressure in a container is metered through an orifice or metering pump to an injection pipe (more customarily a number of injection pipes) and into the soil. It would be expected that feeding the solution through the orifice meter or metering pump, with resultant reduction in the pressure to near atmospheric pressure and vaporization of the ammonia, violent precipitation of sulfur would take place, clogging passageways in the equipment. However, no such precipitation occurs. This follows from consideration of the solubility characteristics of sulfur in liquid ammonia.

Because of the solubility of sulfur in liquid ammonia, there can be prepared solutions containing any amount of sulfur up to about 36% by weight, basis: weight sulfur/weight sulfur+weight ammonia. (Nitrogen-to-sulfur weight ratio: approximately 1.46/1.) It has been found that the solubility of the sulfur varies inversely with the temperature—that is, as the temperature rises, the solubility of sulfur in liquid ammonia falls, and vice versa. Thus, at temperatures below about 0° F., the solubility of sulfur is about 36%, gradually falling with rise in temperature at nearly a constant rate until at 104° F., the solubility of sulfur is about 18%. (Nitrogen-to-sulfur weight ratio: approximately 3.75/1.) Analysis of the pressure-temperature relationship shows that as the pressure falls, the temperature also falls, and it has been found that the resultant sulfur solubility-temperature curve at all points lies below the sulfur maximum solubility-temperature curve, so that no precipitation of the sulfur occurs with reduction in pressure through an orifice meter or metering pump.

From the above, it is evident that solutions of sulfur in liquid ammonia can contain from trace amounts of sulfur up to 36% by weight of sulfur, so that the nitrogen-to-sulfur ratio can vary from a very large number down to approximately 1.46-to-1. As has already been pointed out, the maximum nitrogen-to-sulfur ratio required by plants seldom exceeds about 20-to-1, so that to avoid wastage, it is desirable from practical marketing considerations that the nitrogen-to-sulfur ratio not exceed about 25-to-1. On the other hand, as has already been pointed out, because the solubility of sulfur in liquid ammonia falls with rise in temperature, solutions having low nitrogen-to-sulfur ratios (high sulfur content) may require refrigeration in storage and handling to avoid precipitation of sulfur. For this reason, and because, as also has already been pointed out, the nitrogen-to-sulfur ratio seldom need be below this level, it is preferred that the nitrogen-to-sulfur ratio be at least 2.5-to-1. Such solutions are stable (do not precipitate sulfur) at temperatures up to about 70° F., and need be maintained only below this temperature to assure stability. Of course—again as already pointed out—only a few crops, such as cabbages, turnips and onions, require very large amounts of sulfur, relative to the amount of nitrogen, and this only in some situations. Consequently, in the great majority of cases, the nitrogen-to-sulfur ratio need not be below about 3.75-to-1; such solutions are stable up to 104° F., and accordingly will very seldom present any problem of stability during handling, storage and/or application.

In the formation and use of these solutions of sulfur in liquid ammonia, one factor has been found to be particularly critical—the sulfur and ammonia must be free from thiosulfate and its precursors. Heretofore, the solutions provided by this invention have been characterized as "anhydrous solutions of sulfur in liquid ammonia." This terminology must be taken quite literally—the solution must be essentially anhydrous, for if water is present, it reacts with the solution to form ammonium thiosulfate, which is essentially insoluble in the solution, therefore precipitates and causes plugging of lines, orifices, metering pumps, and other parts of equipment used to handle and/or apply the solution to the soil. Further, in the ammonia-sulfur system, ammonium thiosulfate is strongly acidic, and attacks process equipment, not only corroding it, but producing insoluble complex metal (primarily ferrous) amido imido thiosulfates, which also are insoluble in the system. To illustrate the criticality of the water content: it has been found that if the water content of the solution is about 50–100 parts per million by weight (p.p.m.), sufficient solid material precipitates to cause plugging of small orifices (of the order of 0.008 to 0.020 inch) while water concentrations exceeding about 300 parts per million can cause plugging even of the larger orifices (of the order of 0.060 to 0.10 inch) customarily used in nitrojection techniques, in which the ammonia-sulfur solution is injected directly into soil. Even if equipment such as metering pumps and the like are used, water concentrations in excess of about 500 p.p.m. cannot be tolerated because at this level the amount of solid formed causes plugging of the pump and/or pipes, valves and other parts of equipment used in handling and application of the ammonia-sulfur solution. Accordingly, as used with respect with this invention, the term "anhydrous" will designate an ammonia-sulfur solution containing not more than about 500 p.p.m. of water, or, equivalently, the total weight of water in the sulfur and ammonia cannot exceed 500 p.p.m. based on the total weight of sulfur and ammonia. Preferably, the water concentration is below 300 p.p.m. (same basis) and still more specifically, below 50 p.p.m. (same basis).

To place this factor in its setting in the art, and to properly assess the extent to which the solution must be considered anhydrous, relative to customary practice in the art, attention is directed to the fact that commercial specifications for industrial grade anhydrous ammonia permit up to 0.5% by weight (5000 p.p.m.) of water, while the specifications for agricultural grade ammonia permit up to 0.3% water (3000 p.p.m.). Even the most refined commercial grade of ammonia—refrigeration grade—may contain up to 0.03%—300 p.p.m.

Consequently, it is necessary to use very pure grades of liquid ammonia, and of sulfur. The necessary grade of ammonia can be made without undue difficulty. Sulfur as ordinarily purchased may or may not be suitable, depending upon its water content, and also upon the content of sulfur-oxygen compounds, for any thiosulfate that is present therein of course will not dissolve in the ammonia-sulfur solution, and further it has been found that other sulfur-oxygen compounds in sulfur—such as sulfurous acid, and sulfites in particular—as well as water, react to form thiosulfate. Solid sulfur products—powdered sulfur, flowers of sulfur—usually have too high a water content, and powdered sulfur in particular often contains the undesired sulfur-oxygen compounds. Consequently, it usually is desirable to employ molten sulfur, since its water content is negligible, and it appears to be free of the undesired sulfur-oxygen compounds, or at least contains them in negligible amounts. The molten sulfur should be held for several hours in an open or vented vessel, to permit all of the water to be removed. The temperature of the sulfur should be maintained at a level at which the sulfur is readily fluid and should not be permitted to rise to the temperature at which the sulfur becomes viscous (320° F.). Sulfur melts at about 240° F. Preferably, it is held somewhat above this temperature—say 260–300° F.

In mixing the sulfur and ammonia, there must be taken into account the moderate heat of mixing and the heat introduced if molten sulfur is used. Cooling may be provided if necessary. Otherwise, allowance must be made for the increase in pressure involved as a result of the heat load.

Not only must the original solution be anhydrous, but it must be maintained anhydrous at all times until applied to the soil, for introduction of water at any time will cause the formation of the thiosulfate.

In the ammonia-sulfur solutions provided by this invention, from the standpoint of determining the amount of sulfur and nitrogen to provide, the sulfur and ammonia can be considered as separate entities. That is, the sulfur requirement (average pounds per acre withdrawn for specific yield per acre) for a particular plant species is ascertained, then this is combined with sufficient ammonia to provide the nitrogen required by that plant species. For example, a minimum application of sulfur for a low-sulfur requirement crop such as corn will be about 8 to 10 pounds per acre for yields of 100 bushels. Crops such as cotton require about 12 to 15 pounds per acre for yields of 1.5 bales, while crops such as cabbage and turnips require 20 to 40 pounds of sulfur per acre for yields up to 15 tons. Normal crop requirements of fixed nitrogen run from 80 to 160 pounds per acre. A suitable solution for treating soil to be planted to corn thus might consist of 6.2 pounds of sulfur dissolved for each 100 pounds of liquid ammonia, and applied at the rate of 155 pounds per acre; this would supply about 120 pounds of nitrogen and 9 pounds of sulfur per acre (nitrogen-to-sulfur ratio: 13.3-to-1).

To ascertain the rates of nitrification and sulfofication, comparative tests were conducted, using soil known to be nitrogen and sulfur deficient. Compared were: ammonium sulfate, ammonia-ammonium polysulfide mixture, flowers of sulfur, ammonia, ammonium-sulfur solution, the amount of nitrogen and sulfur being the same in each case. On the basis of the tests, it was found that nitrification was normal and comparable in each case, and that sulfofication took place as follows: ammonium sulfate—ready, short-lived source of sulfur (in effect sulfofication had occurred before the sulfate was introduced into the soil, since plants take up sulfur as sulfate); ammonium polysulfide—ready, short-lived source—very rapid sulfofication; flowers of sulfur, and sulfur from ammonia-sulfur solution—about the same sulfofication rates: relatively slow, with long-lived effect. Application of sulfur to soil by means of compositions provided by this invention has an additional advantage over use of flowers of sulfur: the particles of flowers of sulfur are very fine and accordingly are difficult to spread on the soil, because of the dust characteristics and the irriating character of the dust to eyes, skin and the mucous membrane of nostrils, throat, etc. No such difficulties are encountered when the sulfur is applied via an ammonia-sulfur solution of this invention.

This invention thus provides a stable, versatile method for introducing both sulfur and nitrogen into agricultural soil.

We claim as our invention:

1. In the method of supplying fixed nitrogen, and sulfur, simultaneously to agricultural soil by introducing and disseminating a volatile liquid containing fixed nitrogen, and sulfur, into agricultural soil beneath its surface by means of apparatus in which the liquid flows through wholly enclosed passageways of restricted cross-sectional area, the improvement which avoids interference by solid matter with the flow of the liquid through the wholly enclosed passageways of restricted cross-sectional area in the apparatus used to introduce and disseminate the liquid into the soil, said improvement comprising employing as the liquid a solution formed by dissolving elemental sulfur in anhydrous liquid ammonia, the sulfur and ammonia each being free from contamination by water to the extent that the total amount of water introduced into the solution on their mixing does not exceed 500 parts per million of their combined weights, the proportions of sulfur and ammonia used being such that the nitrogen-to-sulfur weight ratio is maintained above 2.5-to-1, and passing and disseminating the solution into soil by means of apparatus in which the solution flows through wholly enclosed passageways of restricted cross-sectional area, without significant interference by solid matter, maintaining the solution free from contamination by more than 500 parts per million by weight of water until it has passed from the apparatus into the soil.

2. The improvement according to claim 1 wherein the nitrogen-to-sulfur weight ratio is at least 3.75-to-1, but does not exceed about 20-to-1.

3. The improvement according to claim 1 wherein the total amount of water introduced into the solution on its formation, and the maximum permitted in the solution prior to introduction of the solution into the soil, does not exceed 300 parts per million by weight of the combined weights of sulfur and ammonia.

4. The improvement according to claim 3 wherein the nitrogen-to-sulfur weight ratio is at least 3.75-to-1, but does not exceed about 20-to-1.

5. The improvement according to claim 1 wherein the total amount of water introduced into the solution on its formation and the maximum permitted in the solution prior to introduction of the solution into the soil, does not exceed 50 parts per million by weight of the combined weights of sulfur and ammonia.

6. A method for the manufacture of a solution containing fixed nitrogen, and sulfur, suitable for introducing these elements into agricultural soil, from commercial elemental sulfur and commercial anhydrous liquid ammonia, said solution being adapted for introduction and dissemination into agricultural soil without interference by solid material with the flow of the solution through wholly enclosed passageways of restricted cross-sectional area in the apparatus used to introduce and disseminate the solution into the soil, said method comprising freeing commercial elemental sulfur from essentially all sulfur-oxygen compounds and water by melting it, then mixing the resulting purified molten sulfur with commercial anhydrous liquid ammonia, the sulfur and ammonia having been freed, before the mixing thereof, from water to the extent that the total water content of the sulfur and ammonia combined does not exceed 500 parts per million by weight of the total weight of the sulfur and ammonia combined.

7. A method according to claim 6 wherein the molten sulfur is held in a vessel open to the atmosphere for a period sufficient to remove therefrom essentially all sulfur-oxygen compounds and water, before the molten sulfur is mixed with the ammonia.

References Cited

UNITED STATES PATENTS

| | | | |
|---|---|---|---|
| 3,006,755 | 10/1961 | Adams | 71—61 |
| 3,070,434 | 12/1962 | Turner et al. | 71—1 |
| 3,100,698 | 8/1963 | Horsley et al. | 71—28 |

OTHER REFERENCES

Jacobson, C. A., and Hampel, Clifford A.: Encyclopedia of Chemical Reactions, Reinhold Publishing Corp., N.Y. (1958), vol. 7, pp. 131, 134.

Yost, D. M., and Russel, H.: Systematic Inorganic Chemistry, Prentice-Hall, Inc., N.Y. (1944), pp. 33–36.

DONALL H. SYLVESTER, *Primary Examiner.*

ANTHONY SCIAMANNA, *Examiner.*

T. D. KILEY, *Assistant Examiner.*